United States Patent [19]

Kawada et al.

[11] 3,909,844

[45] Sept. 30, 1975

[54] MAGNETIC RECORDING AND REPRODUCING APPARATUS WITH AN AUTOMATIC CARTRIDGE REMOVER

[75] Inventors: Toshio Kawada, Neyagawa; Tadashi Torama, Osaka; Tamio Kobayashi, Hirakata, all of Japan

[73] Assignee: Matsushita Electric Industrial Co., Ltd., Kadoma, Japan

[22] Filed: Nov. 30, 1973

[21] Appl. No.: 420,598

Related U.S. Application Data

[62] Division of Ser. No. 203,347, Nov. 30, 1971, Pat. No. 3,817,539.

[30] Foreign Application Priority Data

Dec. 4, 1970 Japan .............................. 45-107701
Apr. 6, 1971 Japan .............................. 46-21545
May 7, 1971 Japan .............................. 46-30243

[52] U.S. Cl. ..................... 360/61; 360/74; 360/137
[51] Int. Cl.$^{2}$ ........................................ G11B 15/10
[58] Field of Search .................. 360/61, 74, 93, 137

[56] References Cited

UNITED STATES PATENTS 3,575,421 4/1971 Kato .................................. 360/93

*Primary Examiner*—James W. Moffitt
*Attorney, Agent, or Firm*—Stevens, Davis, Miller & Mosher

[57] ABSTRACT

A magnetic recording and reproducing apparatus with a novel construction in which a positioning roller is pressed into a recess formed on the side of a cartridge to load the cartridge on the apparatus, the cartridge being automatically ejected on completion of a performance.

6 Claims, 6 Drawing Figures

MAGNETIC RECORDING AND REPRODUCING APPARATUS WITH AN AUTOMATIC CARTRIDGE REMOVER

This is a division of application Ser. No. 203,347, filed Nov. 30, 1971, and now U.S. Pat. No. 3,817,539.

The present invention relates to a magnetic recording and reproducing apparatus or more in particular a magnetic recording and reproducing apparatus provided with an automatic cartridge ejecting device.

In a magnetic recording and reproducing apparatus employing a cartridge with an endless magnetic tape inside its case, the apparatus is generally provided with means for locating a cartridge as inserted therein at its recording and reproducing position. In such an apparatus, the cartridge must be first released from the means before it is ejected from the apparatus.

The positioning of the cartridge is usually accomplished by pressing a spring-energized roller into contact with a recess formed on the side of the cartridge. The cartridge is ejected by pulling it out by hand against the force of the spring associated with the roller.

Ejecting the cartridge by the above-described method requires considerable manual power. Especially, great care and skill is needed to replace the cartridge in an automobile with the sacrifice of safe driving.

An object of the present invention is to provide a magnetic recording and reproducing apparatus characterized by the accuracy and ease with which a cartridge is inserted into and ejected from it and which has such a novel construction that the cartridge is ejected automatically.

Another object of the present invention is to provide a cartridge ejecting device comprising a pair of guide rails on a base plate for guiding into the recording and reproducing apparatus a cartridge with a tape inside and a recess on one side, a positioning roller on a rotary lever for placing into position the cartridge inserted into the recording and reproducing apparatus, said roller being adapted to be fitted into the recess of the cartridge, an engaging lever which is moved against a spring as the cartridge is inserted, a connecting means which rotates the rotary lever as the result of movement of the engaging lever to press the positioning roller into contact with the side of the cartridge, and a locking means for holding the positioning roller in contact with the cartridge; wherein inserting the cartridge into the recording and reproducing apparatus along the guide rails moves the engaging lever, which in turn causes the connecting means to rotate the rotary lever with the result that the positioning roller is pressed into contact with the side of the cartridge. When the cartridge is inserted further, the positioning roller is fitted into the recess of the cartridge by pressure thereby completing the loading of the cartridge. The state in which the positioning roller is pressed into contact with the cartridge is maintained by the locking means. By releasing this state, the cartridge is automatically ejected by the restitution of the engaging lever energized by a spring.

The above and other objects, features and advantages of the invention will be made apparent by the detailed description taken in conjunction with the accompanying drawings, in which.

Figure 1:
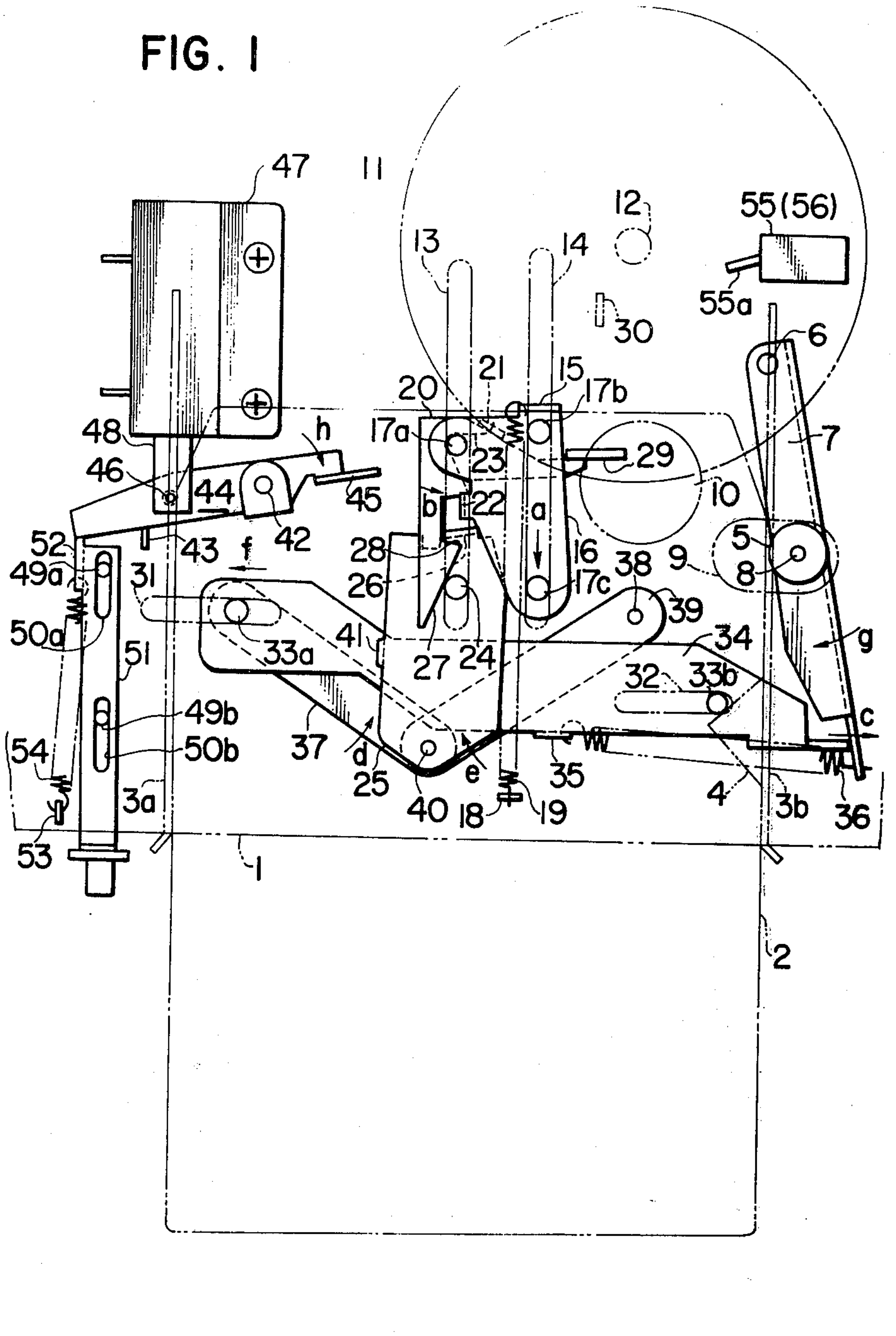
FIG. 1 is a diagram showing a plan of the cartridge ejecting device out of operation.

An embodiment of the present invention will be explained with reference to the accompanying drawings.

Guide rails *3a* and *3b* are attached to a base plate 1 for guiding a cartridge 2 into the recording and reproducing apparatus on the base plate 1. A positioning roller 5, which is pressed into a recess 4 on the side of the cartridge 2 for fixing it into place, is rotatably mounted by means of a pin 8 at the center of a rotary lever 7 which in turn is rotatable about a shaft 6 on the base plate 1. The roller 5 projects above the base plate 1 through an aperture 9 of the base plate 1.

The reference numeral 10 shows a pinch roller incorporated in the cartridge 2 which, when the cartridge 2 has been loaded, is pressed into contact with a capstan 12 integral with a flywheel 11 through a tape (not shown), thereby causing tape feed.

In the same direction as that of the insertion of the cartridge 2, there are two parallel slots 13 and 14 provided on the base plate 1. An engaging lever 16 provided with a bent portion 15 projected above the base plate 1 through the slot 14 is slidable along the slots 13 and 14 by means of the pins 17*a*, 17*b* and 17*c*.

The engaging lever 16 is kept energized in the direction of arrow *a* by a spring 19 suspended between the bent portion 15 and the protrusion 18 of the base plate 1, so that the engaging lever slides in the direction opposite to that of arrow *a* against the spring 19 when the bent portion 15 is brought into contact with the leading edge of the cartridge 2 as it is being inserted.

The pin 17*a* of the engaging lever 16 is fitted with an almost L-shaped rotary lever 20. This lever 20 is rotatably supported by the pin 17*a* which has one end engaged with the protrusion 21 of the rotary lever 20, while the other end thereof is kept driven counterclockwise i.e., in the direction of arrow *b* by the spring 23 engaged with the protrusion 22 of the engaging lever 16. The rotational movement of the lever 20 is stopped by contact with the bent portion 26 of the swingable lever 25 which is slidably and rotatably fitted in the slot 13 with the pin 24.

One end of the rotary lever 20 is formed like a wedge with a slope 27. The rotary lever 20 has at the root of its slope 27 a margin 28 almost at right angles to the longitudinal direction of the slot 13. The bent portion 26 of the swingable lever 25 is in contact with the side of the rotary lever 20 adjacent to one end of the margin 28 remote from the slope 27.

The other end of the rotary lever 20 has a bent protrusion 29 formed on it, which is brought into contact with the protrusion 30 of the base plate 1 when the rotary lever 20 is being slid along by the sliding of the engaging lever 16 in the direction opposite to the arrow *a* after insertion of the cartridge 2. As the rotary lever 20 further slides along, it rotates in the direction opposite to the arrow *b* against the spring 23, thereby detaching the swingable lever 25 from the bent portion 28.

The operating lever 34 with pins 33*a* and 33*b* which are slidable along the guide slots 31 and 32 of the base plate 1 in a direction at right angles to the direction of insertion and removal of the cartridge 2 has one end pressed into contact with a portion near the edge of the rotary lever 7 by means of a spring 36 suspended between the protrusion 35 of the operating lever 34 and the extreme edge of the rotary lever 7. Under these conditions, the levers 7 and 34 move slightly in the direction of arrow *c*, since the spring 36 is located farther from the supporting shaft 6 than the contact point between the operating lever 34 and the rotary lever 7.

Figure 3:
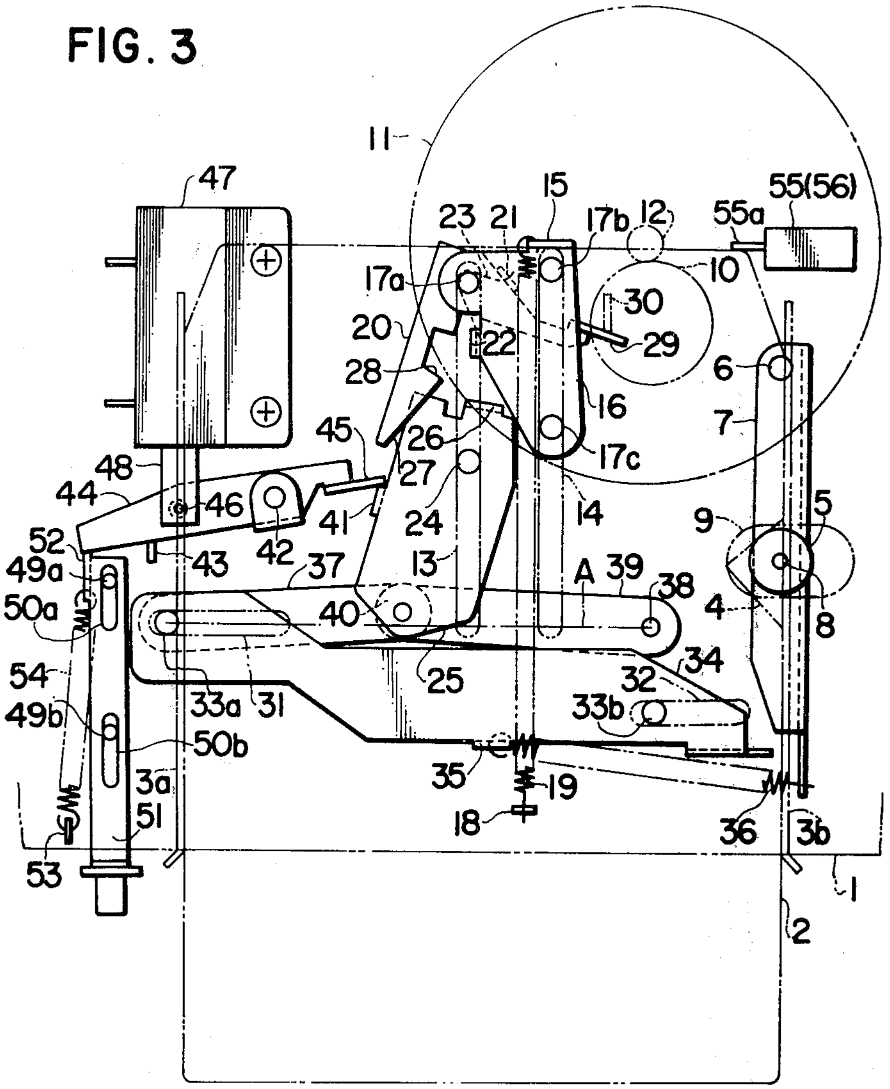
FIG. 3 shows the apparatus according to the invention completely loaded with the cartridge.

The lever 37 with one end rotatably connected with the operating lever 34 by means of the pin 33*a* has the other end connected with an end of the lever 39 by means of the pin 40 of the swingable lever 25, the other end of the lever 39 being rotatably mounted on the base plate 1 with the pin 38, in a such a manner as to form a link. When the swingable lever 25 slides with the engaging lever 16 in the direction opposite to the arrow *a*, the levers 37 and 39 rotate in the directions of arrow *d* and *e* respectively, causing the pin 33*a* to move the operating lever 34 in the direction of arrow *f*. As a result, the rotary lever 7 rotates in the direction of arrow *g* through the spring 36. At the end of the sliding movement of the swingable lever 25, the pin 40 is located beyond the line A joining the pins 33*a* and 38, as shown in FIG. 3.

This condition is maintained by the protrusion 41 of the swingable lever 25 which is brought into contact with the bent portion 45 of the engaging lever 44 which, rotatably mounted on the base plate 1 by means of the shaft 42, is stopped by the protrusion 43 of the base plate 1.

The engaging lever 44 is connected through the pin 46 with the portion 48 of the plunger 47, whereby the engaging lever 44 rotates in the direction of arrow *h* when the plunger 47 is energized.

Also, the engaging lever 44 is rotated as it contacts the bent portion 52 of the operating lever 51 when the lever 51 with its slots 50*a* and 50*b* slidably fitted with the pins 49*a* and 49*b* of the base plate 1 is pushed in against the spring 54 suspended between the bent portion 52 and the protrusion 53 of the base plate 1.

When the cartridge 2 is inserted along the guide rails 3*a* and 3*b* and fixed into position by the positioning roller 5, the leading edge of the cartridge 2 moves the operating portion 55*a* of the power switch 55 on the base plate 1, whereby the power switch 55 closes its contact, an operating switch 56 being interlocked with the power switch 55 in the same housing.

Figure 6:
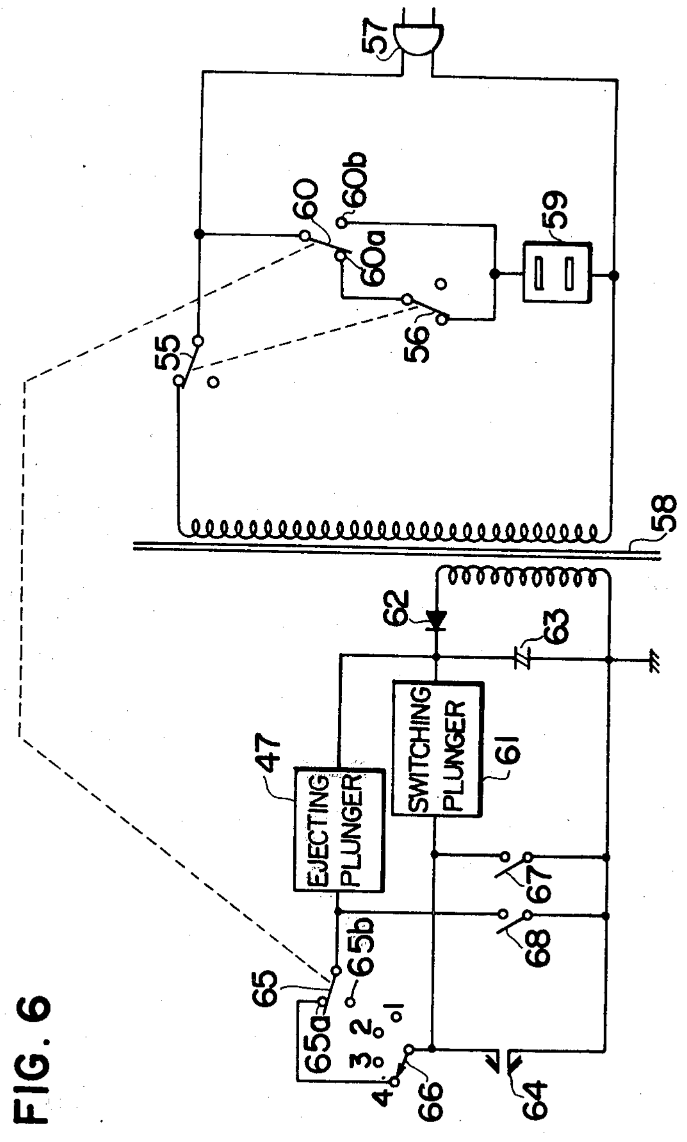
FIG. 6 shows an electric circuit diagram of a control means used with the apparatus according to the invention.

Referring to FIG. 6, the reference numeral 57 shows a power plug, numeral 58 a power transformer, numeral 55 the power switch, numeral 59 a power-branching means such as a socket connected with a power supply, numeral 60 a change-over switch with first and second terminals 60*a* and 60*b* respectively which is inserted in the circuit of the power-branching means 59. The first terminal 60*a* and the second terminal 60*b* are connected through the operating switch 56 and directly respectively to the power-branching means 59. Numeral 61 shows a track-switching plunger which is operative by a secondary winding of the power transformer 58 through a rectifying circuit including a capacitor 63 and a rectifier 62 and through a sensing switch 64, and numeral 47 an ejecting plunger which also is operative by the secondary winding through the sensing circuit 64, and further through an automatic ejecting switch 65 having terminals 65*a* and 65*b* and a rotary switch being inserted in the circuit of the ejecting plunger 47. The rotary switch 66 is interlocked with the vertical movement of a magnetic head, switch 66 moving sequentially from terminal 1 to terminal 4 as each program on the tape is played. The circuit to the ejecting plunger 47 is closed through switch 66 only in position 4 since this position corresponds to the final program and, at its completion, it is desired to eject cartridge 2. Positions 1 – 3 are not connected because automatic ejection is not desired at the end of programs prior to the final program. Numerals 67 and 68 show respectively manual switches for operating the track-switching plunger 61 and ejecting plunger 47.

The power switch 55 and the operating switch 56 which are interlocked with each other are opened when the cartridge 2 is ejected. On the other hand, the change-over switch 60 is interlocked with the automatic ejecting switch 65 in such a manner that when the change-over switch 60 is connected with the first terminal 60*a*, the automatic ejecting switch 65 is closed through terminal 65*a*, while it is opened to make contact with terminal 65*b* when the change-over switch 60 is connected with the second terminal 60*b*.

Operation of the apparatus according to the invention will be now explained.

When the cartridge 2 is inserted into the recording and reproducing apparatus which is out of operation as shown in FIG. 1, the leading edge of the cartridge 2 comes into contact with the bent portion 15 of the engaging lever 16, whereby the engaging lever 16 slides in the direction opposite to that of arrow *a*.

Figure 2:
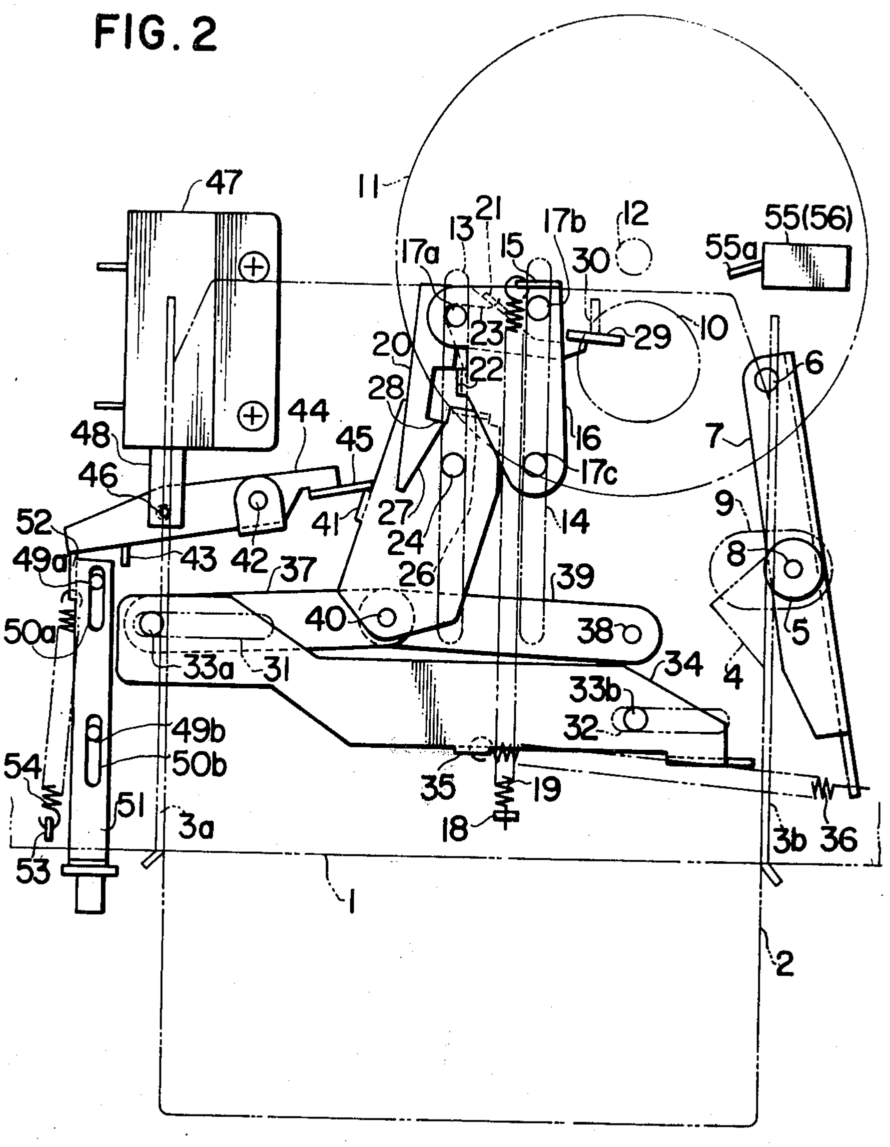
FIG. 2 is a diagram of the apparatus according to the present invention midway during the insertion of a cartridge.

At the same time that the engaging lever 16 slides, the rotary lever 20 moves. In the meantime, the bent protrusion 29 of the rotary lever 20 comes into contact with the protrusion 30, as shown in FIG. 2, so that the rotary lever 20 is rotated in the direction opposite to that of arrow *b* against the spring 23.

While the rotary lever 20 is moving, the bent portion 26 of the swingable lever 25 moves simultaneously by being engaged with the margin 28 of the rotary lever 20. The engagement between the margin 28 and bent portion 26 is released only after the pin 40 connecting the levers 37 and 39 goes beyond the straight line A. As a result, the swingable lever is maintained at the very position to which it has been moved even after the release of the engagement between the swingable lever 25 and rotary lever 20.

When the levers 37 and 39 are rotated in the directions of arrows *d* and *e* respectively by the swingable lever 25, the pin 33*a* moves the operating lever 34 in the direction of arrow *f*, whereby the rotary lever 7 is pulled into rotation in the direction of arrow *g* by the spring 36 with the shaft 6 as a supporting point. As a result, the positioning roller 5 is softly pressed into contact with the side of the cartridge 2, and even after the rotation of the lever 7 is stopped, the operating lever 34 continues to move in the direction of arrow *f* until the engagement between the operating lever 34 and rotary lever 7 is released. The rotary lever 7 is pulled by the spring 36, thereby strongly pressing the positioning roller 5 into contact with the side of the cartridge 2.

Further insertion of the cartridge 2 causes the pinch roller 10 to be pressed into contact with the capstan 12, when the positioning roller 5 is fitted into the recess 4 of the cartridge 2, thereby strongly pressing the side wall of the recess 4 to fix the cartridge 2 into place as shown in FIG. 3.

In this case, the swingable lever 25 tends to move in the direction opposite to that of arrow *a* by means of the levers 37 and 39 with almost the same force as the contact pressure between the positioning roller 5 and the cartridge 2. This tendency, however, is stopped not only by the protrusion 41 which contacts the bent portion 45 of the engaging lever 44 but also by the lever 44 being engaged with the protrusion 43, thus securing the pressure by which the positioning roller 5 is maintained in contact with the cartridge 2.

Figure 4:
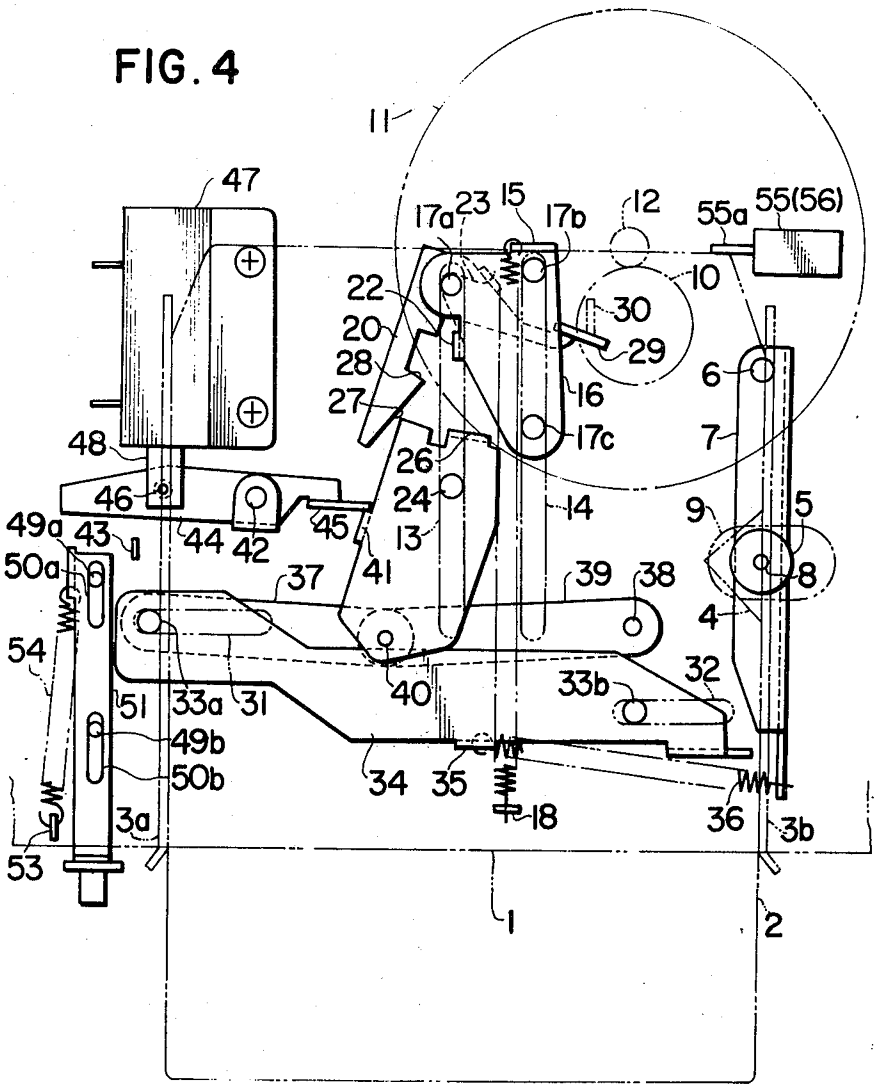
FIG. 4 is a diagram showing the initial stage of cartridge ejection.
Figure 5:
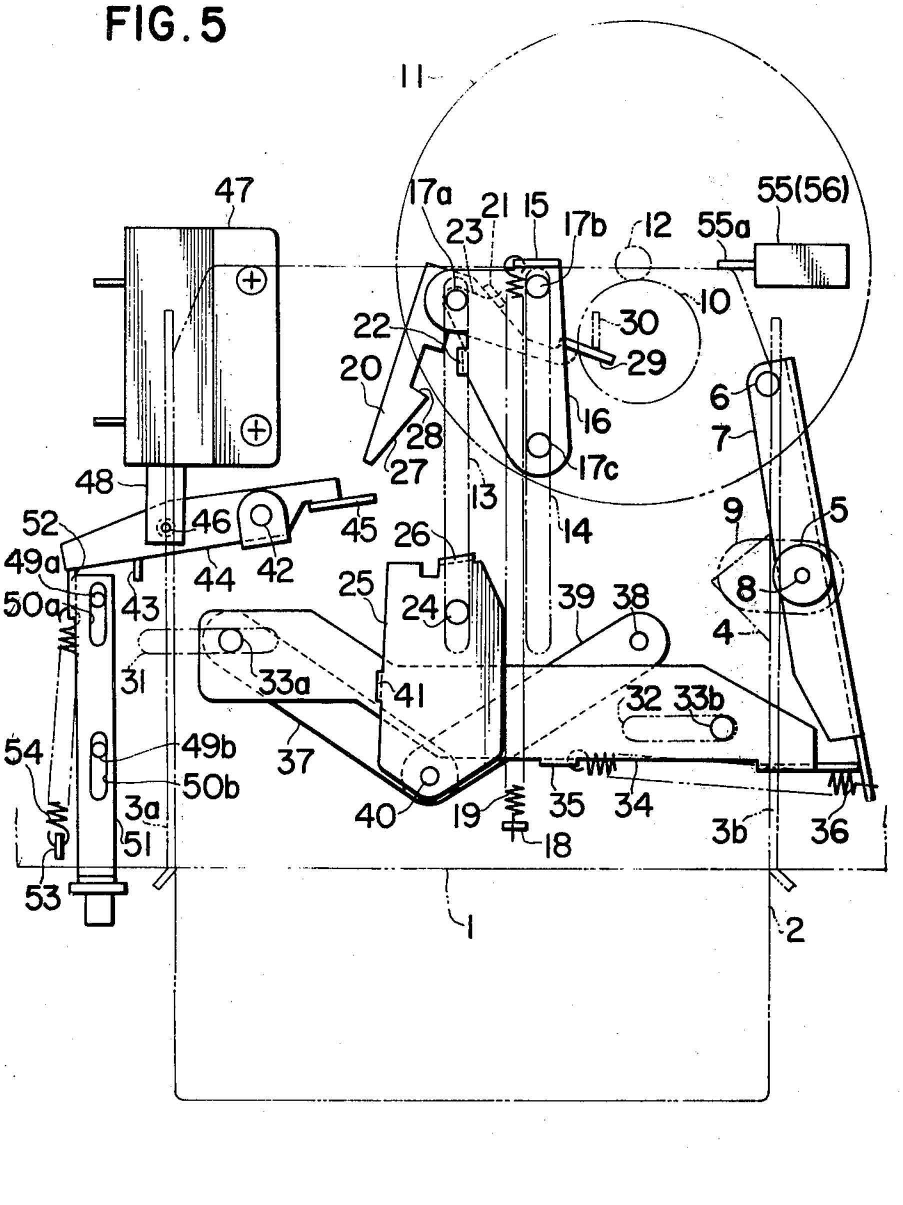
FIG. 5 is a diagram showing the state where the cartridge is in the mid point of ejection.

On completion of a performance, the sensing switch 64 is short-circuited by a metal foil on the tape to energize the plunger 47. The plunger portion 48 is pulled in thereby rotating the engaging lever 44 in the direction of arrow *h*. The swingable lever 25 moves slightly in the direction of arrow *a*, so that the pin 40 moves against the spring 36 and goes back across the straight line A towards the original position as shown in FIG. 4, with the result that the spring 36 causes the levers 37 and 39 to rotate respectively in directions opposite to those of arrows *d* and *e*. The operating lever 34 moves in the direction opposite to that of arrow *f*, weakening the elasticity of spring 36 as shown in FIG. 5. The edge of the operating lever 34 is brought into contact with the edge of the rotary lever 7, eliminating the force with which the positioning roller 5 presses the cartridge 2.

On the other hand, when the swingable lever 25 returns to the original position, the engaging lever 16 is pulled back by the spring 19, pushing the cartridge 2 out of position. As a result, the cartridge 2 is restored to the position of FIG. 1.

Since the rotary lever 20 is disengaged from the protrusion 30 when the lever 16 slides back, the rotary lever 20 is rotated in the direction opposite to that of arrow *b* by the restitution of the spring 23. As the rotary lever 20 moves back together with the engaging lever 16, the slope 27 of the rotary lever 20 comes into contact with the bent portion 26 of the swingable lever 25, so that the rotary lever 20 is rotated against the spring 23. When the bent portion 26 goes beyond the margin 28, the rotary lever 20 is returned, so that the bent portion 26 engages with the rotary lever 20 shown in FIG. 1.

If the removal of the cartridge 2 is desired, in the midst of a performance, the operating lever 51 is pushed in against the spring 54, whereby the engaging lever rotates in the direction of arrow *h* as when the plunger 47 is energized, making it possible to remove the cartridge 2 by hand.

This type of magnetic recording and reproducing apparatus is often equipped with a "tape recorder deck" without any speaker or its own driving circuit. This necessitates provision of a main amplifier for driving the speaker and a power-branching means such as a socket. This power-branching means is usually interlocked with a manual power switch for the magnetic recording and reproducing apparatus for its operation. In the apparatus according to the invention in which the power supply for the equipment is automatically controlled in association with the loading and ejection of the cartridge 2, it is desirable that reproducing signals on the cartridge tape should be turned off simultaneously with the power source including the main amplifier for the speaker when the cartridge 2 is automatically ejected. According to the invention, as shown in FIG. 6, the power switch 55 and the operating switch 56 are closed when the cartridge 2 is loaded.

Also, the automatic ejecting switch 65 is closed through contact 65*a* and the changeover switch 60 interlocked with it is connected with the first terminal 60*a*, when the cartridge 2 ends its performance. At the same time, the sensing switch 64 is short-circuited by the metal foil on the tape, with the result that the cartridge is ejected on the energization of the automatic ejecting switch 65, rotary switch 66 and sensing switch 64.

The ejection of the cartridge 2 opens the power switch 55 and the operating switch 56, thereby stopping power supply to the power-branching means 59, turning off the main amplifier and other equipment connected with the power-branching means.

In the process, the plunger 61 for switching the track is energized to switch the magnetic head against the tape track.

When the automatic ejecting switch 65 is opened to make contact with terminal 65*b*, the changeover switch 60 interlocked with it makes up a power circuit serving the power-branching means 59 through the second terminal 60*b*. Under these conditions, operation of the manual switch 68 causes the ejecting plunger 47 to be energized to eject the cartridge 2. In this case, even though the power switch 55 and operating switch 56 are opened, the continued connection between the change-over switch 60 and the second terminal 60*b* maintains the circuit of the power-branching means 59 energized regardless of the opening or closing of the power switch 55, keeping in operation the equipment connected with the power-branching means 59.

The above explanation is concerned with the recording and reproducing apparatus used with a cartridge with an endless tape in it. But the present invention is not limited to such an apparatus but is applicable also to other types of recording and reproducing apparatuses employing a cartridge with a tape incorporated in it.

We claim:

1. In a magnetic recording and reproducing apparatus having a magnetic head, means for ejecting a cartridge having a tape therein, comprising power-branching means for supplying power to components of said recording and reproducing apparatus, a change-over switch having first and second terminals, the second terminal of said change-over switch being connected directly to said power-branching means, a first power switch interposed between the first terminal of said change-over switch and said power-branching means, said power-branching means, change-over switch and first power switch being connected across a power supply, an ejection plunger for ejecting said cartridge, an automatic ejection switch connected in series with said ejection plunger and interlocked with said change-over switch, said automatic ejection switch being closed when said change-over switch is contacting its first terminal and open when said change-over switch is contacting its second terminal, a second power switch for coupling said ejection plunger and automatic ejection switch across said power supply, said second power switch being interlocked with said first power switch, and means for opening said first and second power switches simultaneously upon ejection of said cartridge.

2. The apparatus defined by claim 1 which further comprises a manual ejection plunger switch coupled between said ejection plunger and said power supply for manually ejecting said cartridge.

3. The apparatus defined by claim 1 which further comprises a rotary switch interlocked with the movement of said magnetic head and having a plurality of terminals corresponding to programs on said tape, a selected terminal of said rotary switch being connected in series with said automatic ejection switch for energizing said ejection plunger upon completion of the corresponding program.

4. The apparatus defined by claim 3 wherein the tape in said cartridge has a metal foil thereon, said apparatus further comprising a sensing switch connected in series with said automatic ejection switch, said sensing switch energizing said ejection plunger through said automatic ejection switch and said rotary switch when its contacts are short-circuited by the metal foil on said tape.

5. The apparatus defined by claim 1 wherein the tape in said cartridge has a metal foil thereon, said apparatus further comprising a sensing switch connected in series with said automatic ejection switch, said sensing switch energizing said ejection plunger through said automatic ejection switch when its contacts are short-circuited by the metal foil on said tape.

6. The apparatus defined by claim 5 which further comprises a track-switching plunger and manual track-switching plunger switch coupled across said power supply by said second power switch, said manual track-switching plunger switch being further coupled in parallel with said sensing switch.

* * * * *